Sept. 16, 1952     I. W. LOVELADY ET AL     2,610,698
EMULSION TREATER
Filed July 3, 1950     4 Sheets-Sheet 1
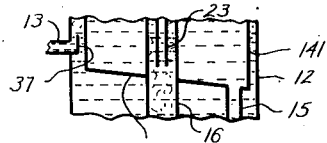
Fig. 12
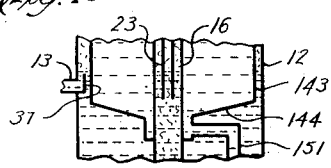
Fig. 13
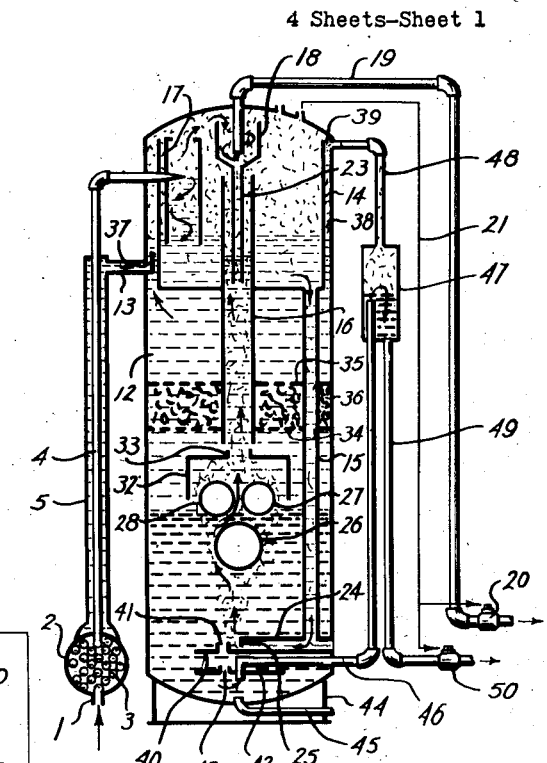
Fig. 1
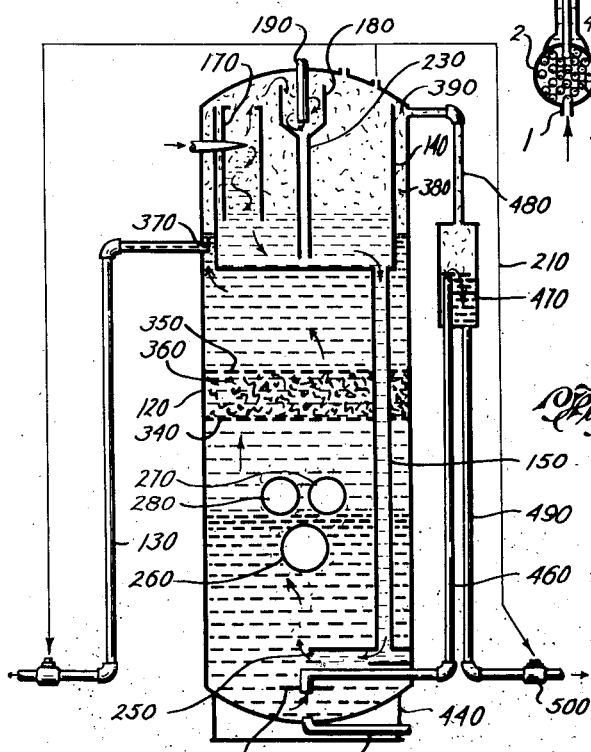
Fig. 2
Fig. 8
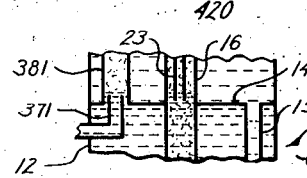
Fig. 14
Isaac W. Lovelady
Sanford P. Kroeker
INVENTORS
BY Browning & Simms
ATTORNEYS

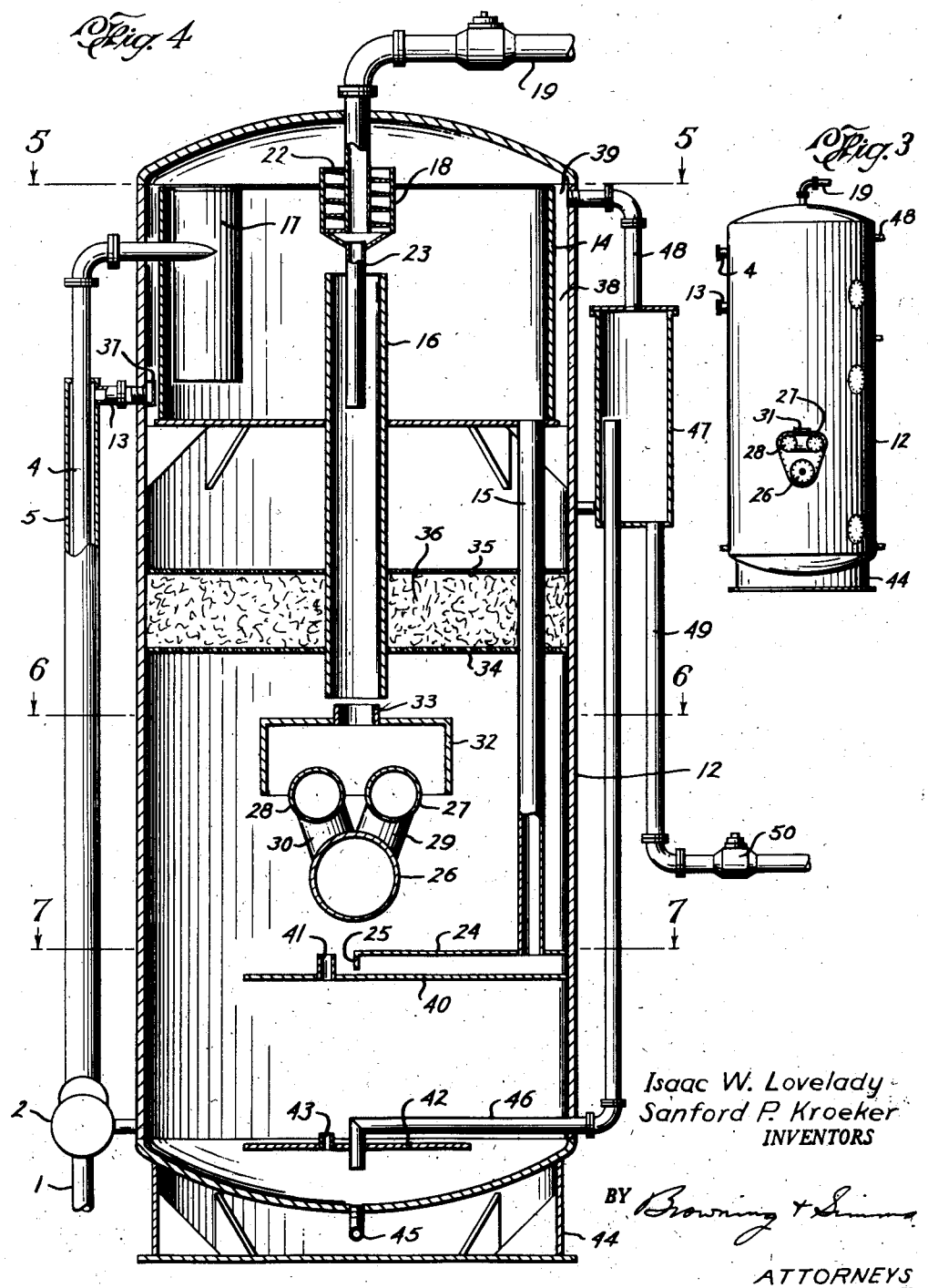

Sept. 16, 1952  I. W. LOVELADY ET AL  2,610,698
EMULSION TREATER
Filed July 3, 1950  4 Sheets-Sheet 3
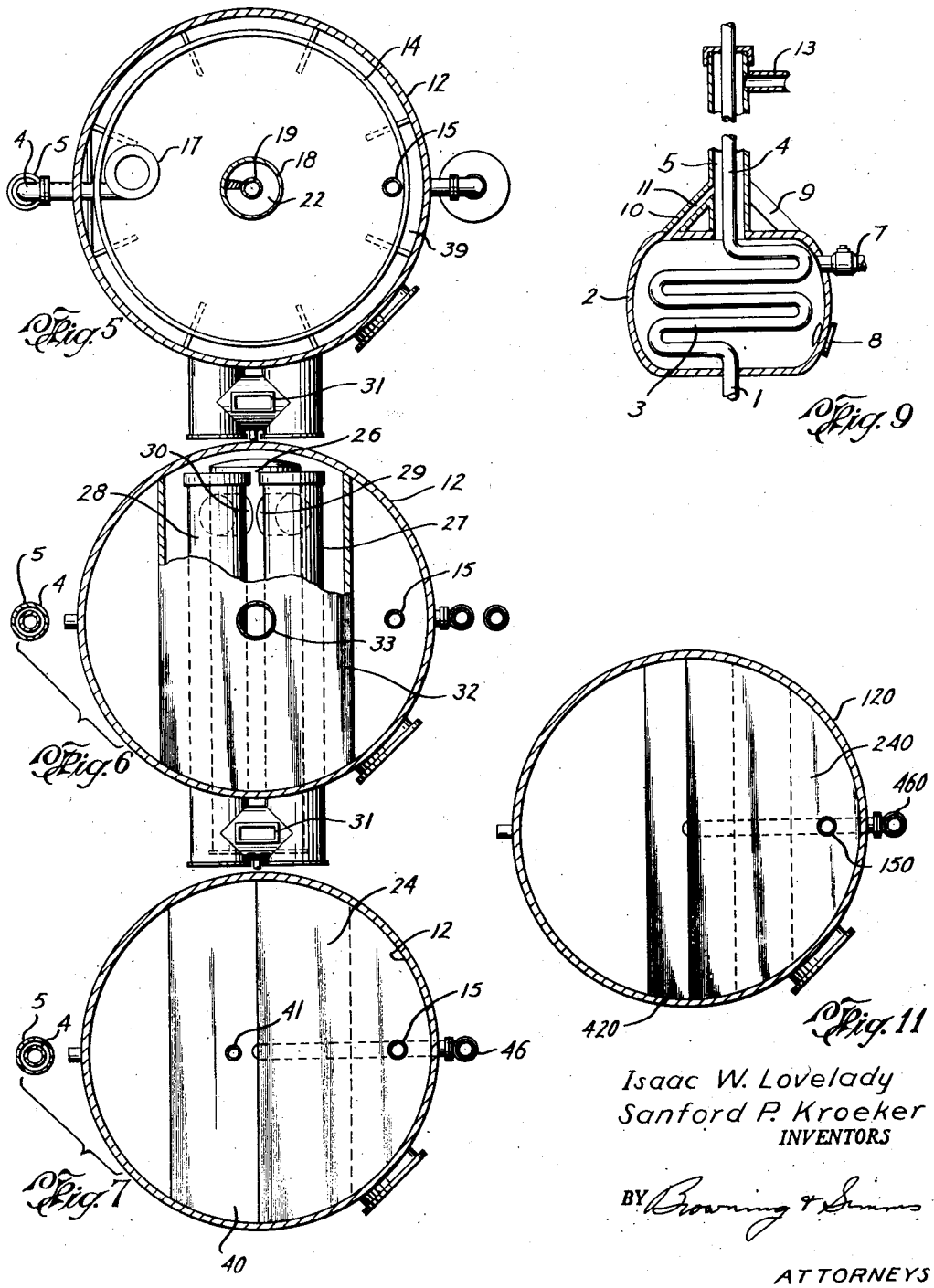
Isaac W. Lovelady
Sanford P. Kroeker
INVENTORS
BY Browning & Simms
ATTORNEYS

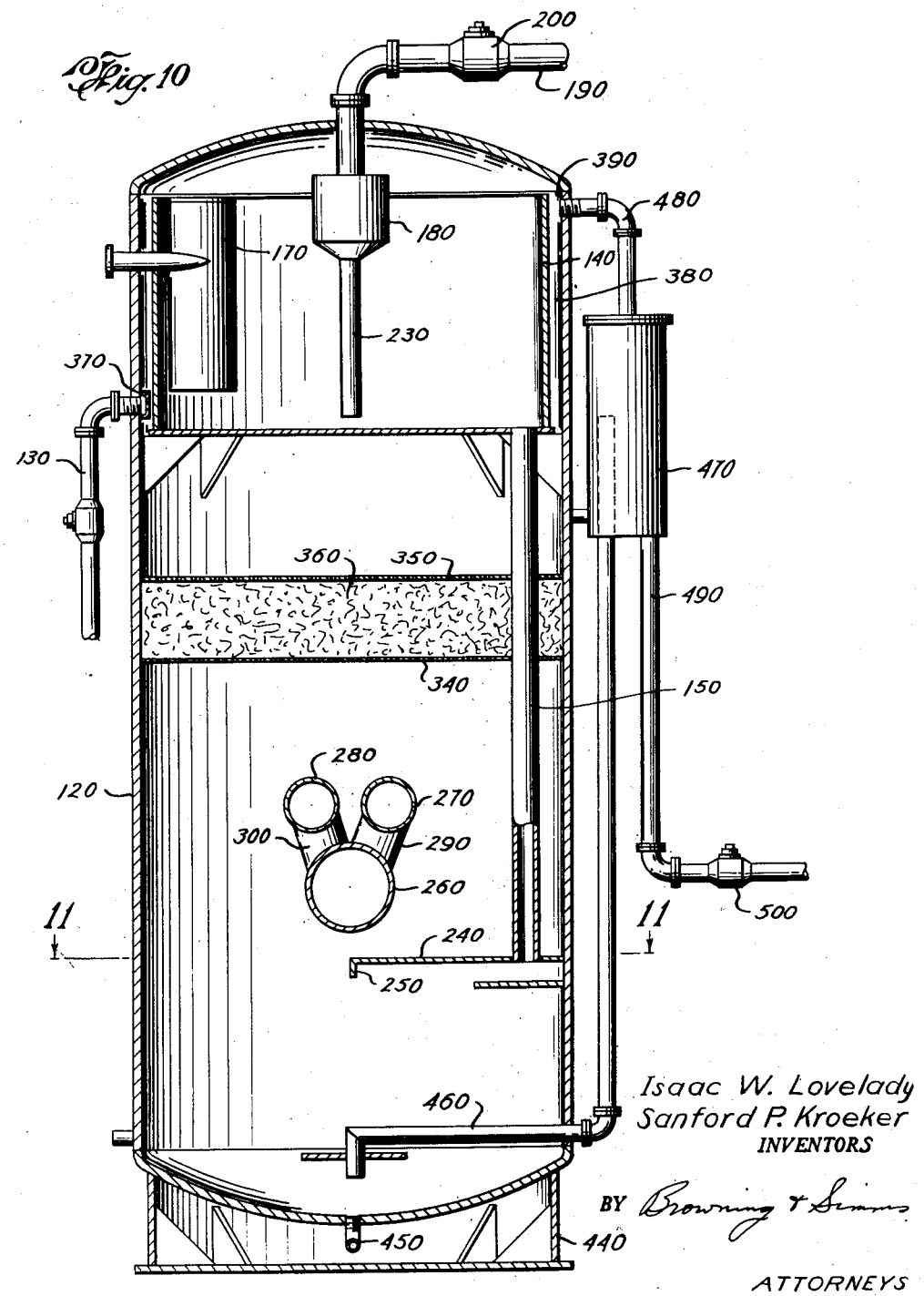

Patented Sept. 16, 1952

2,610,698

UNITED STATES PATENT OFFICE 2,610,698

EMULSION TREATER

Isaac W. Lovelady and Sanford P. Kroeker, Odessa, Tex., assignors to Sivalls Tanks, Inc., Odessa, Tex., a corporation of Texas Application July 3, 1950, Serial No. 171,806

13 Claims. (Cl. 183—2.7)

This invention relates to improvements in emulsion treaters and refers more particularly to the treatment of mixtures such as gas and two or more liquids. The apparatus of this invention is especially adapted for the separation of emulsions of petroleum gas and oil with water, and for the treatment of similar emulsions which may occur in the course of refining hydrocarbon products.

In many oil and gas wells the well fluids produced are in the form of emulsions of petroleum gas and crude oil with water. This water is many times in an emulsion known as a "tight" emulsion which is very hard to break so as to permit the separation of the oil and water, but in most cases it includes portions which may be termed "free water" or which consist of emulsions which may be readily broken up so as to produce free water. It is desirable to separate these three general components at or near their location of production after which the separated oil, gas and water are drawn off through separate lines and the water disposed of in some suitable fashion. Heretofore various apparatuses have been employed for this purpose, but, for the purpose of treating tight emulsions, these have either been ineffective or inefficient in that they require the treatment not only of the tight portion of the emulsion but of substantial quantities of free or nearly free oil and water. Furthermore, in the past most of the methods for breaking of emulsions and separating the constituents thereof have been such as to cause substantial losses of the lighter liquids desired to be retained.

It is therefore an object of this invention to provide an emulsion treater which will accomplish the breaking of the emulsion and the separation of the gas and liquids with the least possible loss of desirable lighter liquids with the gas.

Another object is to provide an emulsion treater which will accomplish the greatest possible heat economy.

Another object of this invention is to provide an emulsion treater which will permit initial centrifugal separation of the constituents and subsequent gravity separation in a quiescent state, first, without heating, then with heating.

Another object is to provide an emulsion treater which will make possible the initial separation of gas from mechanical centrifuge action and subsequently by quiescent gravity separation.

Another object is to provide an emulsion treater in which the gas and liquid interface while the liquid is hottest will be reduced to a minimum thereby reducing loss of high vapor pressure desirable liquids.

Another object of this invention is to provide an emulsion treater in which the liquid separation zone may be kept at a constant temperature regardless of the rate of flow through the treater.

Another object is to provide an emulsion treater in which the gas released in a heating zone will pass up through a quiescent column of the separated lighter liquid constituent to the gas outlet whereby it will be stripped of vapors of the lighter liquid constituent.

Another object is to provide an improved heat exchanger for cooling the hottest liquid constituent leaving the treater and preheating the emulsion entering the treater and which will not be subject to gas locking.

Other objects and advantages of this invention will become apparent from the following description taken in connection with the accompanying drawings wherein is set forth by way of illustration and example certain embodiments of this invention useful for treating extremely tight emulsions and other embodiments thereof useful for treating emulsions which are not so tight.

In the drawings:

Figure 1 is a schematic view in vertical cross section through an emulsion treater constructed in accordance with this invention and arranged in such fashion as to be capable of treating tight emulsions of the type hereinbefore mentioned.

Figure 2 is a similar view of a modified form intended for treating emulsions which are not so tight.

Figure 3 is a side elevation showing the exterior of an emulsion treater constructed along the lines shown in Figures 1 and 2.

Figure 4 is a view in vertical cross section through the tank of an emulsion treater such as shown schematically in Figure 1, omitting, however, certain of the external valves and connections which are indicated in Figure 1.

Figure 5 is a horizontal cross section taken along the line 5—5 of Figure 4.

Figure 6 is a horizontal cross section taken along the line 6—6 of Figure 4.

Figure 7 is a horizontal cross section taken along the line 7—7 of Figure 4.

Figure 8 is a fragmentary perspective showing the arrangement of the wier plate which determines the level of the liquid within the emulsion treater, this wier plate being placed in the outlet for the lighter liquid constituent separated in this treater.

Figure 9 is a vertical cross section through a heat exchanger such as employed in connection with the emulsion treater illustrated in Figures 1 and 4.

Figure 10 is a view similar to Figure 4 but illustrating a vertical cross section through an emulsion treater such as shown schematically in Figure 2.

Figure 11 is a horizontal cross section taken along the line 11—11 of Figure 10.

Figures 12, 13 and 14 are fragmentary views similar to a mid-portion of Figure 1 showing modified cold flume structures.

Referring now more in detail to the drawings, the inlet for cold emulsion which will be considered as being petroleum gas and oil with water, is shown at 1 as entering a heat exchanger 2 and passing through the tubes 3 thereof. It then flows upwardly through the inlet pipe 4 from which it is injected into the body of the treater, but in flowing upwardly it is illustrated as being jacketed by a downcoming pipe 5 of larger diameter, which, as will hereinafter be more fully explained, conducts hot treated liquid of the lighter constituent separated out in the treater, this constituent in the case of an emulsion such as just referred to being oil or a mixture of oil and emulsion. This downcoming hot oil from the treater serves to preheat the emulsion rising in the pipe 4 and tends to prepare this emulsion for the initial separation of gas, oil and water in the cold upper portion of the emulsion treater as will be described. At its lower end the conduit 5 opens into the interior of the heat exchanger 2, and in this heat exchanger it is brought additionally into contact with the conduit for the incoming emulsion to be treated so as to additionally preheat such emulsion, after which it is discharged through a suitable pipe and valve 7.

Of course, the heat exchanger 2 may be provided with suitable hand holes 8 and with braces 9 and 10 adapted to better support it rigidly with respect to the downcoming conduit 5. The draw off of oil from the heat exchanger shell 2 through the valve 7 being at the upper portion of the shell and at one extremity thereof, there will be little danger of accumulation of gas at this point, but gas will tend to separate from the liquid in the other parts of the shell and this gas will rise either directly through the conduit 5 or through the hollow 11 in brace 10. Gas so liberated will pass countercurrent to the downcoming oil stream in the conduit 5 and will be released into the upper portion of the emulsion treater in the manner presently to be shown.

The main body of the emulsion treater is housed within the tank or vessel 12, and the upper end of the conduit 5 is connected to this vessel by a suitable pipe connection 13.

Inside the upper end portion of the vessel 12 is an open upper end cup-like member 14 having its bottom closed, which will be referred to as a flume, or as a cold flume. Liquid is adapted to be drawn off from this flume through the pipe 15 which communicates with the bottom of the flume and extends from the bottom of the flume downwardly to a point adjacent but above the lower end of the vessel 12. Also extending downwardly through the bottom of the flume but, unlike the pipe 15, extending upwardly above the bottom of the flume as well as downwardly below the bottom thereof, is a gas vent pipe 16, the function of which will appear from the following description. Also located within the flume 14 is a centrifugal separator shell 17 into which the pipe 4 empties in a direction tangential with respect to the centrifugal separator shell 17 and intermediate the ends thereof. It is to be noted that the upper end of this shell, as illustrated in Figure 1, is provided with an inturned flange so that it will be unlikely that any liquid will escape from the upper end of the shell even during the violent centrifugal action which is intended to take place in the operation of the treater.

Opening from the upper portion of the vessel 12 above the flume is a centrifugal mist eliminator 18 through which gas from the upper end of the vessel 12 must pass in order to enter the intake end of the outlet pipe 19 through which gas passes from the treater. As seen in Figure 1, this gas is drawn off through a suitable pressure operated valve 20 in such fashion as to at all times maintain the desired pressure within the treater. This valve and other pressure operated valves may, if desired, be connected to the gas space at the top of the treater by means of a pressure line 21.

The centrifugal mist eliminator 18 is provided on its interior with a spiral vane 22 which makes the gas flowing downwardly through the eliminator 18 move in a circular path thereby subjecting it to centrifugal action for the purpose of extracting mist which may be contained therein. This gas moves downwardly to the lower end of the enlarged part 18 and then enters the lower end of the pipe 19. Meantime, mist which is separated in this centrifugal mist eliminator is caused to pass down through the drain 23 into the gas vent pipe 16, and thence on through the liquid zone contained within the flume 14 and through the other parts into the liquid body in the lower portion of the treater.

The emulsion, upon being subjected to centrifugal action within the centrifugal separator 17 as it enters from the pipe 4, will not only cause the separation of gas which will rise through the upper end of the centrifugal separator shell 17 into the upper end of the vessel 12 and thence out through the pipe 19, but will also tend to cause the separation of the liquids from each other and to cause these liquids to fall into and to stratify within the flume 14. These liquids, however, will be drawn off from the bottom of this flume through the pipe 15 which discharges at its lower end adjacent the lower portion of but above the bottom of the vessel 12, beneath the baffle 24. This baffle 24 is provided with a downturned flange 25 at its edge and is so arranged that the liquid flowing from the bottom end of the pipe 15 and out under the baffle 24 will be released from the lower edge of the flange 25 directly beneath a heater consisting of a fire tube 26 and heated gas tubes 27 and 28 which are connected at 29 and 30 respectively, with the rear end of the fire tube 26. As will be seen in Figures 5 and 6, these gas tubes 27 and 28 project from the surface of the shell at their front ends and are connected to provide a flue box 31 through which fumes may be discharged.

Located directly above the heater just described is a gas collector hood 32 adapted to receive gas which may be driven off from the liquid in the course of the heating operation. This gas will be discharged through an opening 33 at the upper portion of this collector hood, this opening 33 being disposed directly beneath the lower end of the gas vent pipe 16 so that gas from the opening 33 will pass directly into and up through the vent pipe 16 into the upper portion of the vessel above the liquid in the flume 14. It will also be seen that the opening 33 is somewhat smaller than the vent pipe 16 so that there is provided an opening at the lower end of this vent pipe through which liquid which passes upwardly through the hood 32 and out the opening 33 may flow from the vent pipe.

It will be seen that the liquid moving upwardly through the tank 12 from the heater will be caused to pass through the filter comprising the retaining plates 34 and 35 and the filter body 36, the filter thus taking up the entire cross section of the tank 12 excepting only for the passage of the pipes 15 and 16 therethrough.

The upper level of the liquid in the emulsion treater is determined by the outlet for the lighter liquid which is across the top of a wier plate 37 into the outlet pipe 13. It will further be seen that the wier pipe 37 is located in the very narrow annular space 38 between the flume 14 and the outer wall of the vessel 12. It is located so that the lower end portion of the flume 14 will always be in the liquid about to be discharged across the wier plate 37 and will tend to cool such liquid because of the fact that the liquid within the cold flume will be colder than that which has been passed over the heater 26. At the same time, the relatively small amount of free gas liquid contact surface between the hot liquid in the lower portion of the treater and the gas in the upper portion of the treater, will tend to reduce to a minimum the loss of the lighter fractions of this lighter liquid. The level of the liquid maintained in the treater will, of course, be substantially the same both inside of and outside of the cold flume 14, and as illustrated this will be such that the lower end of the centrifugal separator shell 17 will be dipped beneath the level of the liquid in the flume. Any gas which does escape from the upper surface of the liquid in the annular space 38 may pass upwardly and out through the annular opening 39 into the gas space in the top of the treater.

Located below the baffle 24 is another baffle 40 having an opening 41 therefrom disposed substantially beneath the heater 26. It will be appreciated that the heater tends to cause separation of the oil and water so that the water will move downwardly and the oil will pass upwardly through the filter 36. Any water already separated as it comes down through the pipe 15, being heavier than the oil and emulsion, will flow out over the baffle 40 and off its edges and downwardly toward the outlet from the treater. This water cannot flow downwardly through the opening 41 because this opening has an upstanding lip around it, but gas which collects beneath the baffle 40 due to separation from the water located in that position, may pass upwardly through the opening 41 without having to pass through water. Its discharge, together with any oil that separates from the water below the baffle 40, will be directly onto the heater 26 so that it will be fully treated.

Another similar baffle is provided at 42 a substantial distance beneath the baffle 40 and adjacent the bottom of the treater. This baffle is made in the same manner with an opening 43 therethrough disposed substantially beneath the opening 41 and for the same purpose.

The vessel which comprises the main portion of this treater is supported by any suitable foundation such as that illustrated at 44 and may be provided with a suitable drain 45 at its lower end. However, for the purpose of drawing off the water or other heavier liquid there is provided a pipe 46 which has its intake end located beneath the baffle 42. This pipe 46 leads upwardly along the side of the treater tank and projects into a water siphon box 47, its upper end providing a wier, the level of which determines the level of the interface between the water and oil and oil emulsion in the treater.

The upper end of the siphon box 47 is connected by means of a line 48 with the gas space at the upper end of the treater, and with a drainpipe 49 with an outlet valve 50 which serves to maintain the liquid in the pipe 49 at a predetermined level. As illustrated in Figure 1, it may be connected by means of the pressure line 21 with the gas space at the upper end of the treater so that its operation will be affected only by the level of the liquid and not by the pressure of the gas in the upper end of the treater.

It is to be noted that the level of the wier provided by the upper end of the pipe 46 is preferably such that the interface level between the water and the oil and oil emulsion in the lower portion of the treater will be substantially at the level of the heater 26. This is clearly indicated in Figure 1 of the drawings.

The form shown in Figure 2 is substantially similar to that illustrated in Figure 1 except that in this form the gas vent pipe 16 is omitted together with the gas collector hood 32 and the intake heat exchanger 2, and a simpler system of baffles as used in the lower portion of the treater.

In this form, the incoming emulsion, without preheating is injected tangentially into the centrifugal separator shell 170, thereby separating the gas which passes upwardly into the gas space and thence to the centrifugal mist eliminator 180 and into the gas outlet pipe 190 which is controlled by a gas outlet valve 200. A gas line 210 may be employed for the same purposes as heretofore described for the gas pressure line 21.

The drain 230 from the lower end of the mist eliminator 180 empties into the cold flume 140 in this form of the invention instead of into the gas vent pipe 16 in the previous form.

Liquid flows downwardly from the flume 140 through the pipe 150 and out under the baffle 240 and the downturned flange 250 at the outer edge thereof. This liquid, being lighter than the water which occupies the major portion of the extreme lower end of the tank 120, flows upwardly from the flange 250 and around the heater provided by the fire box 260 and the tubes 270 and 280 which are connected with the fire box 260 at the rear end thereof by means of connecting tubes 290 and 300.

Above the heater there is a filter provided by the retainer plates 340 and 350 which are perforate plates, between which is confined a body of filter material 360. This filter material in the case of both forms of the invention is preferably wood excelsior or some similar material.

The wier plate 370 corresponds in function to the wier plate 37 of the previously described form and controls the level of the liquid in the treater, serving also as the outlet wier for the lighter constituents that pass out through the outlet pipe 130.

As before, the flume 140 takes up the major portion of the cross section of the tank 120 and leaves only a small annular space 380 providing communication between the space below the flume and that above the flume so that any gas escaping from the liquid as a result of heating in the heater 260 may pass upwardly through this space 380, out through the annular opening 390 into the gas space above the flume. Another baffle 420 is located adjacent the lower end of the vessel 120. The vessel 120 may be supported by suitable foundation 440 and have a suitable drain 450 in its lower end. The heavier liquid separated in the treater is to be drawn off through the outlet pipe 460 which opens at its upper end into the water siphon box 470. The upper end of this pipe 460 serves as a wier for the purpose of determining the level of the interface between the liquid constituents in the tank 120 and is so located as to preserve this level at substantially the level of the heater 260. The box 470 is connected by a gas line 480 with the gas space in the upper portion of the treater and with an outlet pipe 490 with the outlet valve 500.

In operation, the form of the invention illustrated in Figure 1 calls for the introduction of emulsion to be treated through the opening 1 into the heat exchanger 2 from which it flows into the treater through the inlet pipe 4. In the heat exchanger 2, it passes through tubes 3, and in these tubes and while flowing up through the inlet pipe 4 it becomes somewhat preheated by taking up excess heat from the oil which has been separated out of the emulsion in the emulsion treater and which flows through the outlet 13 and down through the conduit 5 and through the heat exchanger 2, being drawn off from the heat exchanger 2 through the valve 7.

The thus preheated emulsion, having somewhat more of a tendency to break than before the preheating step, is introduced through the pipe 4 into the centrifugal separator 17 in a tangential direction. This tangential introduction causes a swirling within the centrifugal separator 17 and provides a centrifugal separating action within this separator. This centrifugal separating action tends to separate the free gas from the emulsion so that it will rise to the top of the separator into the space at the top of the emulsion treater. The liquids cannot pass out through the top of the centrifugal separator shell because of the inturned flange at the upper end thereof, but will move downwardly, and due to the separating action within the shell, the free water which may exist within the emulsion may be separated out so that the liquids will tend to stratify within the cold flume 14 as they move in fairly quiescent fashion toward the outlet pipe 15. While in this cold flume 14 these liquids will tend to become further preheated by virtue of the contact of the hot oil which is in contact with the outside and lower portion of the cold flume 14, and thus to be placed in condition for still further breaking of the emulsion. During the fairly quiescent flow from the centrifugal separator 17 to the outlet 15 there will be opportunity for any free gas remaining within the emulsion to bubble off into the gas space above the liquid, and for free water to settle out of the emulsion.

The pipe 15 being flush with the bottom surface of the cold flume 14 will tend to keep this cold flume almost free of water and to draw off that portion of the emulsion within the cold flume which has the most water in it.

Upon reaching the bottom end of the outlet pipe 15 the water will tend to run off the outer edge of the baffle 40 and flow toward the lower end of the treater tank 12 so as to enter the water outlet pipe 46, while the oil will tend to rise under the baffle 24 and be released therefrom by passing under the lower edge of the downturned flange 25 at the outer edge of this baffle. The oil so released will rise directly under the heater 26 which will apply a considerable amount of heat to the emulsion so as to reduce the surface tension of the constituents thereof and cause the emulsion to break up very readily. This breaking up of the emulsion in the heater 26 will cause the free water to be released and drop downwardly toward the bottom of the tank while the gas and oil will be released beneath the hood 32 and will rise up through the opening 33 at the upper end thereof. The gas will continue up through the gas vent pipe 16 and into the free gas space above the cold flume while the oil will pass out through the opening between the upper end of the hood 32 and the lower end of the pipe 16 into the space below the filter 36. As liquid rises within the space beneath the cold flume, it will come in contact with the cold flume and its upper level will be determined by the level of the upper edge of the wier plate 37 in the outlet for the lighter liquid which in the case of the emulsion assumed will be oil. This hot oil will flow out through the outlet 13 and down through the conduit 5 preheating the incoming emulsion in this conduit and in the heat exchanger 2 as heretofore described. The oil will be released from the conduit 5 and the heat exchanger 2 by means of a level controlled valve 7 which will maintain substantially a predetermined level of liquid within the conduit 5.

The water from the bottom end of the emulsion treater tank 12 will be drawn off through the pipe 46 and will spill over the wier provided by the upper end of this pipe within the siphon box 47. When the weight of the column of liquid between the top of the wier plate 37 and the intake of the pipe 46 is sufficient due to excessive accumulation of water in the bottom of the tank 12 to cause the column of water in the pipe 46 to rise and spill over the top thereof, water will be drawn off from the tank 12 so as to maintain the interface between the water and the emulsion substantially at the level of the heater 26. By maintaining the interface substantially at this level, the oil being freed from the emulsion at the heater 26 may move directly into a body of oil while the water being freed at this point may move directly into a body of water without either having to pass through a substantial body of the other, thereby increasing the efficiency of the separation. Furthermore, the gas released will pass directly up through a column of almost pure oil and into the gas space without having to pass through liquid in the form of emulsion not yet treated, thereby reducing the likelihood of the gas becoming again entrained in the liquid.

The hottest liquid in the system, coming in contact with the coldest liquid in the bottom of the cold flume, will tend to preheat this liquid in the cold flume and thereby increase the heat efficiency of the treater. At the same time, the minimum of surface of the hot oil is exposed to the gas around the annular passage 38 so that there will be the least likelihood of the lighter fractions of the oil being vaporized and lost with the gas, yet any gas accumulating within the body of oil adjacent the bottom of the cold flume will be readily released through the annular space 38 and the opening 39 into the top of the treater.

Gas passing off from the top of the treater will be forced through the spiral vane of the mist eliminator 18 so as to centrifugally separate mist which may be existing therein, said mist being thereupon drained down through the drain 23 into the body of oil below. The gas passes off through the pipe 19, and the gas draw-off will be controlled by the pressure operated valve 20 while the water draw-off from the trap 47 will be controlled through the pressure operated valve 50. The effect of the gas pressure within the upper end of the treater on both of these valves may be eliminated by providing an auxiliary connection 21 between these valves and the gas in the upper end of the treater. Thus, water will be maintained at substantially a predetermined level within the pipe 49 and the trap 47 but will be drawn off as fast as it spills over the wier at the upper end of the pipe 46.

The operation of the device set forth in Figure 2 is substantially the same as that shown in Figure 1 with the exception that no preheater is provided for the incoming emulsion, the same being emptied cold into the upper end of the cold flume 140 through the centrifugal separator 170, and there is no provision for gas to rise directly from the heater into the gas space above the cold flume, gas separated in the heater being caused to pass into the gas space through the annular passage 380. Another slight change is that the drain 230 from the mist eliminator 180, instead of emptying directly into the body of oil about to leave the treater, empties into the bottom of the liquid body within the cold flume 140.

This type of treater illustrated in Figure 2 is highly satisfactory for emulsions not quite so tight as those for which the treater illustrated in Figure 1 is designed.

In the case of either the form shown in Figure 1 or that shown in Figure 2, the cold flume variations shown in Figures 12, 13, and 14 may be substituted.

In referring to Figure 12, it will be seen that the cold flume 141 is provided with a bottom 142 which slopes from all directions toward the drain into the pipe 15, thereby making for better drainage of sludge and water from the cold flume.

For the same purpose the bottom 144 of the cold flume 143 in Figure 13 may be provided with a central sump which may surround the gas vent pipe 16, and to provide a pipe 151 of L-shape to connect to and drain from such sump.

In Figure 14 the cold flume is formed of the upper part of the vessel 12 by welding the bottom 145 directly to the walls of the vessel. In such structure the annular gas passage 38 of Figure 1 is replaced by a pipe 381 opening through the bottom 145 and extending upwardly to near the top of the vessel. The wier 37 is then replaced with the open end L-shaped outlet wier pipe 371, the open end of which extends up into pipe 381.

The operation of the modifications shown in Figures 12, 13, and 14 will be apparent from the description which has already been given.

From the foregoing it will be seen that a means has been provided for carrying out and accomplishing all of the objects and advantages of this invention.

The invention having been described, what is claimed is:

1. In an emulsion treater a vessel closed except for inlet and outlet connections, a cold flume within and adjacent the top of said vessel for receiving the cold emulsion and providing an opportunity for quiescent separation of gas from liquid and liquids from each other by gravity, said cold flume extending across the major portion of the cross section of said vessel but less than the entire cross section to permit passage between the space above and the space below said flume, a pipe for conducting liquid from within the bottom of said flume to a point in said vessel a substantial distance below said flume, an outlet for gas above said flume, an outlet for heavier liquid below the discharge of said pipe, an outlet for the lighter liquid from said vessel adjacent but above the level of the lower end of said flume, a heater above the outlet of said pipe, and means for maintaining a desired level of the interface of the heavier liquid and the emulsion after discharge from said pipe.

2. In an emulsion treater a vessel closed except for inlet and outlet connections, a cold flume within and adjacent the top of said vessel for receiving the cold emulsion and providing an opportunity for quiescent separation of gas from liquid and liquids from each other by gravity, said cold flume extending across the major portion of the cross section of said vessel but less than the entire cross section to permit passage between the space above and the space below said flume, a pipe for conducting liquid from within the bottom of the said flume to a point in said vessel a substantial distance below said flume, an outlet for gas above said flume, an outlet for heavier liquid below the discharge of said pipe, an outlet for the lighter liquid from said vessel adjacent but above the level of the lower end of said flume, a heater above the outlet of said pipe, and means for maintaining the level of the interface between the heavier liquid and the emulsion after discharge from said pipe at substantially the level of said heater so that the latter extends into both the liquids forming the interface.

3. In an emulsion treater, a vessel closed except for inlet and outlet connections, a cold flume within and adjacent the top of said vessel for receiving the cold emulsion and providing an opportunity for quiescent separation of gas from liquid and liquids from each other by gravity, said cold flume extending across the major portion of the cross section of said vessel but less than the entire cross section to permit passage between the space above and the space below said flume, a pipe for conducting liquid from within the bottom of said flume to a point in said vessel a substantial distance below said flume, an outlet for gas above said flume, a centrifugal separator connected to the entrance of said gas outlet to separate free liquid from gas flowing into said outlet, a drain from said centrifugal separator and having a discharge opening below said flume for draining such separated liquid into the body of liquid in the vessel below the flume without contact with the body of gas above the liquid in the flume and without contact with the liquid in the flume, an outlet for heavier liquid below the discharge of said pipe, an outlet for the lighter liquid from said vessel adjacent but above the level of the lower end of said flume, a heater above the outlet of said pipe, and means for maintaining a desired level of the interface of the heavier liquid and the emulsion after discharge from said pipe.

4. In an emulsion treater, a vessel closed except for inlet and outlet connections, a cold flume within and adjacent the top of said vessel for receiving the cold emulsion and providing an opportunity for quiescent separation of gas from liquid and liquids from each other by gravity, said cold flume extending across the major portion of the cross section of said vessel but less than the entire cross section to permit passage between the space above and the space below said flume, a pipe for conducting liquid from within the bottom of said flume to a point in said vessel a substantial distance below said flume, an outlet for gas above said flume, an outlet for heavier liquid below the discharge of said pipe, an outlet for the lighter liquid from said vessel adjacent but above the level of the lower end of said flume, a heater above the outlet of said pipe, means for maintaining a desired level of the interface of the heavier liquid and the emulsion after discharge from said pipe, and a gas vent pipe extending from within the body of liquid below the cold flume into the gas space above the cold flume.

5. In an emulsion treater, a vessel closed except for inlet and outlet connections, a cold flume within and adjacent the top of said vessel for receiving the cold emulsion and providing an opportunity for quiescent separation of gas from liquid and liquids from each other by gravity, said cold flume extending across the major portion of the cross section of said vessel but less than the entire cross section to permit passage between the space above and the space below said flume, a pipe for conducting liquid from within the bottom of said flume to a point in said vessel a substantial distance below said flume, an outlet for gas above said flume, a centrifugal separator connected to the entrance of said gas outlet to separate free liquid from gas flowing into said outlet, a drain from said centrifugal separator with a discharge opening below said flume for draining such separated liquid back into the body of liquid in the vessel below the flume without contact with the body of gas above or the liquid in the flume, an outlet for heavier liquid below the discharge of said pipe, an outlet for the lighter liquid from said vessel adjacent but above the level of the lower end of said flume, a heater above the outlet of said pipe, means for maintaining a desired level of the interface of the heavier liquid and the emulsion after discharge from said pipe, and a gas vent pipe extending from within the body of liquid below the cold flume into the gas space above the cold flume and receiving the said drain.

6. In an emulsion treater, a vessel closed except for inlet and outlet connections, a cold flume within and adjacent the top of said vessel for receiving the cold emulsion and providing an opportunity for quiescent separation of gas from liquid and liquids from each other by gravity, said cold flume extending across the major portion of the cross section of said vessel but less than the entire cross section to permit passage between the space above and the space below said flume, a pipe for conducting liquid from within the bottom of said flume to a point in said vessel a substantial distance below said flume, an outlet for gas above said flume, an outlet for heavier liquid below the discharge of said pipe, an outlet for the lighter liquid from said vessel adjacent but above the level of the lower end of said flume, a heater above the outlet of said pipe, means for maintaining a desired level of the interface of the heavier liquid and the emulsion after discharge from said pipe, a gas vent pipe extending from within the body of liquid below the cold flume into the gas space above the cold flume, a gas collector hood over said heater and having an outlet from its top in vertical alignment with the lower end of said gas vent pipe but spaced therefrom to direct the gas released from the liquid by said heater into said gas vent pipe to be conducted thereby into the gas space above the cold flume and to permit liquid to flow through the hood outlet into the vessel surrounding said vent pipe.

7. In an emulsion treater, a vessel closed except for inlet and outlet connections, a cold flume within and adjacent the top of said vessel for receiving the cold emulsion and providing an opportunity for quiescent separation of gas from liquid and liquids from each other by gravity, said cold flume extending across the major portion of the cross section of said vessel but less than the entire cross section to permit passage between the space above and the space below said flume, a pipe for conducting liquid from within the bottom of said flume to a point in said vessel a substantial distance below said flume, an outlet for gas above said flume, an outlet for heavier liquid below the discharge of said pipe, an outlet for the lighter liquid from said vessel adjacent but above the level of the lower end of said flume, a heater above the outlet of said pipe, means for maintaining a desired level of the interface of the heavier liquid and the emulsion after discharge from said pipe, a gas vent pipe extending from within the body of liquid below the cold flume into the gas space above the cold flume, a gas collector hood over said heater and having an outlet from its top in vertical alignment with the lower end of said gas vent pipe but spaced therefrom to direct the gas released from the liquid by said heater into said gas vent pipe to be conducted thereby into the gas space above the cold flume, the outlet from the top of said hood being of smaller diameter than said vent pipe to provide an annular space therebetween whereby liquid may flow from said gas vent pipe.

8. In an emulsion treater, a vessel closed except for inlet and outlet connections, a cold flume within and adjacent the top of said vessel for receiving the cold emulsion and providing an opportunity for quiescent separation of gas from liquid and liquids from each other by gravity, said cold flume extending across the major portion of the cross section of said vessel but less than the entire cross section to permit passage between the space above and the space below said flume, a pipe for conducting liquid from within the bottom of said flume to a point in said vessel a substantial distance below said flume, an outlet for gas above said flume, an outlet for heavier liquid below the discharge of said pipe, an outlet for the lighter liquid from said vessel adjacent but above the level of the lower end of said flume, a heater above the outlet of said pipe, means for maintaining a desired level of the interface of the heavier liquid and the emulsion after discharge from said pipe, a filter extending across the cross section of said vessel between said heater and said lighter liquid outlet, a gas vent pipe extending from within the body of liquid below the cold flume and below said filter into the gas space above said cold flume, and a gas collector hood over said heater and having an outlet from its top in vertical alignment with the lower end of said gas vent pipe to direct gas released from the liquid by said heater into said gas vent pipe to be conducted thereby into the gas space above the cold flume, there being an opening from said vent pipe below said filter whereby liquid may flow from said vent pipe into the space below said filter.

9. In an emulsion treater, a vessel closed except for inlet and outlet connections, a cold flume within and adjacent the top of said vessel for receiving the cold emulsion and providing an opportunity for quiescent separation of gas from liquid and liquids from each other by gravity, said cold flume extending across the major portion of the cross section of said vessel but less than the entire cross section to permit passage between the space above and the space below said flume, a pipe for conducting liquid from within the bottom of said flume to a point in said vessel a substantial distance below said flume, an outlet for gas above said flume, an outlet for heavier liquid below the discharge of said pipe, an outlet for the lighter liquid from said vessel adjacent but above the level of the lower end of said flume, a heater above the outlet of said pipe, a wier in the lighter liquid outlet for maintaining a desired level of liquid in said vessel, a liquid level control valve for withdrawing liquid accumulating above a predetermined level on the lower level side of said wier, and means for maintaining a desired level of the interface of the heavier liquid and the emulsion after discharge from said pipe.

10. In an emulsion treater, a vessel closed except for inlet and outlet connections, a cold flume within and adjacent the top of said vessel for receiving the cold emulsion and providing an opportunity for quiescent separation of gas from liquid and liquids from each other by gravity, said cold flume extending across the major portion of the cross section of said vessel but less than the entire cross section to permit passage between the space above and the space below said flume, a pipe for conducting liquid from within the bottom of said flume to a point in said vessel a substantial distance below said flume, an outlet for gas above said flume, an outlet for heavier liquid below the discharge of said pipe, an outlet for the lighter liquid from said vessel adjacent but above the level of the lower end of said flume, a heater above the outlet of said pipe, a wier in the lighter liquid outlet, a liquid level control valve for withdrawing liquid accumulating above a predetermined level on the lower level side of said wier, a wier in the heavier liquid outlet, and a liquid level control valve for withdrawing liquid accumulating above a predetermined level on the lower level side of said last mentioned wier.

11. In an emulsion treater a vessel closed except for inlet and outlet connections, a cold flume within and adjacent the top of said vessel for receiving the cold emulsion and providing an opportunity for quiescent separation of gas from liquid and liquids from each other by gravity, said cold flume extending across the major portion of the cross section of said vessel but less than the entire cross section to permit passage between the space above and the space below said flume, a pipe for conducting liquid from within the bottom of said flume to a point in said vessel a substantial distance below said flume, said pipe being connected with the bottom of said cold flume adjacent one extremity thereof and said cold flume bottom sloping from all points toward the point where said pipe is connected, an outlet for gas above said flume, an outlet for heavier liquid below the discharge of said pipe, an outlet for the lighter liquid from said vessel adjacent but above the level of the lower end of said flume, a heater above the outlet of said pipe, and means for maintaining a desired level of the interface of the heavier liquid and the emulsion after discharge from said pipe.

12. In an emulsion treater a vessel closed except for inlet and outlet connections, a cold flume within and adjacent the top of said vessel for receiving the cold emulsion and providing an opportunity for quiescent separation of gas from liquid and liquids from each other by gravity, said cold flume extending across the major portion of the cross section of said vessel but less than the entire cross section to permit passage between the space above and the space below said flume, a pipe for conducting liquid from within the bottom of said flume to a point in said vessel a substantial distance below said flume, the bottom of said cold flume being of substantially conical shape with its lowest point adjacent the center thereof and said pipe being connected to the bottom of said cold flume substantially at said lowest point, an outlet for gas above said flume, an outlet for heavier liquid below the discharge of said pipe, an outlet for the lighter liquid from said vessel adjacent but above the level of the lower end of said flume, a heater above the outlet of said pipe, and means for maintaining a desired level of the interface of the heavier liquid and the emulsion after discharge from said pipe.

13. In an emulsion treater a vessel closed except for inlet and outlet connections, a cold flume within and adjacent the top of said vessel for receiving the cold emulsion and providing an opportunity for quiescent separation of gas from liquid and liquids from each other by gravity, said cold flume being formed by a bottom plate forming the bottom of the cold flume and integrally secured to the walls of said vessel at the circumference thereof, said plate having an opening therein and a pipe extending upwardly from said opening to a point adjacent the upper end of said vessel whereby said cold flume extends across the major portion of the cross section of said vessel but less than the entire cross section thereof by the extent of said upstanding pipe to permit passage between the space above and the space below said flume, a pipe for conducting liquid from within the bottom of said flume to a point in said vessel a substantial distance below said flume, an outlet for gas above said flume, an outlet for heavier liquid below the discharge of said pipe, an outlet for the lighter liquid from said vessel adjacent but above the level of the lower end of said flume, a heater above the outlet of said pipe, and means for maintaining a desired level of the interface of the heavier liquid and the emulsion after discharge from said pipe.

ISAAC W. LOVELADY.
SANFORD P. KROEKER.

REFERENCES CITED

The following references are of record in the file of this patent:

UNITED STATES PATENTS

| Number | Name | Date |
|---|---|---|
| 1,557,103 | Smith | Oct. 13, 1925 |
| 2,181,686 | Walker | Nov. 28, 1939 |
| 2,181,688 | Walker | Nov. 28, 1939 |
| 2,232,948 | Ihrig et al. | Feb. 25, 1941 |
| 2,297,297 | Walker | Sept. 29, 1942 |
| 2,342,950 | Lovelady et al. | Feb. 29, 1944 |
| 2,528,032 | Candler et al. | Oct. 31, 1950 |

FOREIGN PATENTS

| Number | Country | Date |
|---|---|---|
| 587,012 | Great Britain | Apr. 10, 1947 |